US006925129B1

(12) United States Patent
Huber

(10) Patent No.: US 6,925,129 B1
(45) Date of Patent: Aug. 2, 2005

(54) METHOD AND CIRCUIT ARRANGEMENT FOR IMPROVED DATA TRANSMISSION

(75) Inventor: Klaus Huber, Darmstadt (DE)

(73) Assignee: Deutsche Telekom AG, Bonn (DE)

(*) Notice: Subject to any disclaimer, the term of this patent is extended or adjusted under 35 U.S.C. 154(b) by 0 days.

(21) Appl. No.: 09/530,934

(22) PCT Filed: Jul. 31, 1998

(86) PCT No.: PCT/EP98/04789

§ 371 (c)(1),
(2), (4) Date: May 5, 2000

(87) PCT Pub. No.: WO99/25103

PCT Pub. Date: May 20, 1999

(30) Foreign Application Priority Data

Nov. 6, 1997 (DE) .......................... 197 48 880

(51) Int. Cl.⁷ .............................. H04L 23/02

(52) U.S. Cl. ................. 375/261; 375/264; 370/207

(58) Field of Search .................. 375/260, 261, 375/262, 264, 265, 285, 286, 293, 296, 298, 341, 346; 714/751, 752, 775, 786, 792, 794, 795, 805; 370/204, 206, 207, 208, 211

(56) References Cited

U.S. PATENT DOCUMENTS

| 4,801,899 A | * | 1/1989 | Ashida ..................... 332/103 |
| 4,937,844 A | | 6/1990 | Kao |
| 4,980,897 A | * | 12/1990 | Decker et al. .............. 375/265 |
| 5,115,453 A | * | 5/1992 | Calderbank et al. ........ 375/265 |
| 5,493,586 A | | 2/1996 | Brownlie et al. |
| 5,583,892 A | | 12/1996 | Drakul et al. |
| 5,764,699 A | * | 6/1998 | Needham et al. ........... 375/261 |
| 6,198,776 B1 | * | 3/2001 | Eyuboglu et al. .......... 375/286 |
| 6,304,593 B1 | * | 10/2001 | Alouini et al. ............. 375/216 |

FOREIGN PATENT DOCUMENTS

| EP | 0 674 413 | 9/1995 |
| EP | 0 703 689 | 3/1996 |

OTHER PUBLICATIONS

Richard E. Blahut, "Baseband and Passband Modulation," Digital Transmission of Information, pp. 20–88, described in the specification.
David A. Huffman, "A Method for the Construction of Minimum–Redundancy Codes," Proceedings of the I.R.E., vol. 40, Sep. 1952, pp. 47–50, described in the specification.
Klaus Huber, Decoding Algorithms for Block Codes over Two–Dimensional Signal–Constellations, IEEE, 1994, p. 472.
Klaus Huber, "Codes Over Eisenstein–Jacobi Integers," Contemporary Mathematics, vol. 168, 1994, pp. 165–179, described in the specification.

(Continued)

Primary Examiner—Tesfaldet Bocure
Assistant Examiner—Khanh Cong Tran
(74) Attorney, Agent, or Firm—Kenyon & Kenyon

(57) ABSTRACT

A method and a circuit arrangement for efficient use of multistage modulation methods using orthogonal base functions for the representation of a signal to be transmitted. Signal points of a signal constellation are selected according to a respective predetermined and/or selected probabilities so as to optimize a respective signal energy and/or a respective signal data rate, the selected signal points each having a defined respective energy. A 16-QAM signal constellation can be used, for example, for transmitting at low data rates. In the circuit arrangement, a source (1) which supplies a data stream (2) and is connected to a code converter (3) for converting the data stream. The output of the code converter (3) is connected to a modulator (4) in which the corresponding signal points are selected according to the respective probabilities. The data stream (2) is then transmitted over a channel (5), and a demodulator (6) situated downstream from a code converter (7) carries out the inverse operation.

26 Claims, 3 Drawing Sheets

OTHER PUBLICATIONS

Klaus Huber, "Codes Over Tori," IEEE Transactions on Information Theory, vol. 43, No. 2, Mar. 1997, pp. 740–744, described in the specification.

Klaus Huber, "Codes Over Gaussian Integers," IEEE Transactions on Information Theory, vol. 40, No. 1, Jan. 1994, pp. 207–216, described in the specification.

Frank R. Kschischange et al., "Optimal Nonuniform Signaling for Gaussian Channels", IEEE Transactions on Information Theory, vol. 39, No. 3, May 19, 1993, pp. 913–929.

Jay N. Livingston, "Shaping Using Variable–Size Regions", IEEE Transactions on Information Theory, vol. 38, No. 4, Jul. 1992, pp. 1347–1353.

* cited by examiner

Table 1

| $E_j$ | $p_1$ | $p_2$ | $p_3$ | $p_4$ | $H$ |
|---|---|---|---|---|---|
| 2.526 | 1/19 | 1/19 | 1/19 | 1/19 | 4.2479 bit |
| 1.7224 | 0.1313 | 0.08534 | 0.03603 | 0.02341 | 4 bit |
| 0.8118 | 0.3372 | $9.931 \cdot 10^{-2}$ | $8.614 \cdot 10^{-3}$ | $2.537 \cdot 10^{-3}$ | 3 bit |
| 0.3962 | 0.6133 | $6.370 \cdot 10^{-2}$ | $6.870 \cdot 10^{-4}$ | $7.135 \cdot 10^{-5}$ | 2 bit |

FIG. 4

Table 2

| Point | Binary data |
|---|---|
| $z_1$ | 100 |
| $z_{21}$ | 1101 |
| $z_{22}$ | 1100 |
| $z_{23}$ | 1111 |
| $z_{24}$ | 1110 |
| $z_{25}$ | 001 |
| $z_{26}$ | 000 |
| $z_{31}$ | 01111 |
| $z_{32}$ | 01110 |
| $z_{33}$ | 10101 |
| $z_{34}$ | 10100 |
| $z_{35}$ | 10111 |
| $z_{36}$ | 10110 |
| $z_{41}$ | 01001 |
| $z_{42}$ | 01000 |
| $z_{43}$ | 01011 |
| $z_{44}$ | 01010 |
| $z_{45}$ | 01101 |
| $z_{46}$ | 01100 |

METHOD AND CIRCUIT ARRANGEMENT FOR IMPROVED DATA TRANSMISSION

FIELD OF THE INVENTION

The present invention relates to a method and a circuit arrangement for improved data transmission for efficient use of multi-level modulation processes which employ orthogonal basis functions to represent a signal to be transmitted according to the preambles of claim 1 and claim 9, respectively.

RELATED TECHNOLOGY

In telecommunications engineering, transmission methods are known, and also used in practice, which utilize orthogonal basis functions to represent the signal to be transmitted. Such transmission methods are described, for example, in the book of R. E. Blahut, *Digital Transmission of Information*, Addison-Wesley, Reading, 1990, chapters 2 and 3 which is hereby incorporated by reference herein.

In this case, a message signal s(t) in the baseband is represented as the sum of orthogonal basis functions. In order to integrate the message $m=(m_0, m_1, m_2 \ldots m_{K-1})$—where the $m_j$ are selected from an appropriately chosen alphabet—into the signal s(t), the signal is formed as follows:

$$s(t)=m_0 f_0(t)+m_1 f_1(t)+ \ldots +m_{K-1} f_{K-1}(t).$$

Consequently, a message signal can be regarded as a point in a K-dimensional space and specifically is characterized by the value-tuple $(m_0, m_1, \ldots, m_{K-1})$. The entirety of all permissible signals is referred to as a signal constellation. Especially popular in practice are two-dimensional signal constellations, such as the so-called 16-QAM signal constellation shown in FIG. 1 of the present application. This 16-QAM signal constellation is described, for example, in the aforementioned book on page 63. In all the signal constellations considered here, it is assumed that the minimum distance between two signal points is normalized to 1. However, the known transmission methods for efficient use of multi-level modulation methods do not yet permit the optimal utilization of the signal energy of signal constellations. First of all, signal constellations which are very efficient may, however, have the disadvantage that the number of signal points is not a power of two and, secondly, frequently employed signal constellations, such as 16-QAM, cannot yet be used in simple and optimal manner to transmit low data rates.

Fundamental theoretical investigations on improved data transmission and on the efficient use of multi-level modulation methods employing orthogonal basis functions to represent a signal to be transmitted and using, for example, the known Huffman method as a source coding method have been published in F. R. Kschischang, S. Pasupathy, "*Optimal Nonuniform Signaling for Gaussian Channels*", IEEE Transactions on Information Theory, Vol. 39, No. 3, May 1993, pp. 281–300, which is hereby incorporated by reference herein. However, practical implementations of these investigations in the form of circuit arrangements and/or corresponding methods for operating such circuit arrangements have not been specified.

SUMMARY OF THE INVENTION

Therefore, the object of the invention is to provide a method and a circuit arrangement for improved data transmission with efficient use of multi-level modulation methods which permit optimal use of the signal energy of signal constellations and by which frequently employed signal constellations, such as 16-QAM, can be used in simple and optimal manner to transmit lower data rates.

The present invention provides a method for data transmission using a multi-level modulation process to represent a signal for transmission, the multi-level modulation process using at least one orthogonal basis function. Signal points of a signal constellation are selected according to at least one respective predetermined and/or selected probability so as to optimize a respective signal energy and/or a respective signal data rate, the selected signal points each having a respective defined energy.

The present invention also provides a circuit arrangement for data transmission using a multi-level modulation process, the multi-level modulation process using at least one orthogonal function, the circuit arrangement including a data source for providing a data stream; a recoder downstream of the data source; a modulator for selecting signal points of a signal constellation according to at least one respective predetermined and/or selected probability so as to optimize a respective signal energy and/or a respective signal data rate, the selected signal points each having a defined respective energy, the modulator being connected to an output of the recoder; a transmission channel, an input of the transmission channel being connected to an output of the modulator; a demodulator, an input of the demodulator being connected to an output of the transmission channel; an inverse recoder for executing the operation inverse to that of the recoder, an input of the inverse recoder being connected to the demodulator; and a data sink, an input of the sink being connected to an output of the inverse recoder.

The method and the circuit arrangement described here permit optimal utilization of the signal energy of signal constellations. This can be of advantage for technical applications in two respects. First of all, signal constellations which are very efficient, but have the disadvantage that the number of signal points is not a power of two, can now be adapted in a simple manner to data formats used in practice, such as a bit sequence. Secondly, frequently employed signal constellations, such as 16-QAM, can be used in simple and optimal manner to transmit lower data rates. Thus, the 16-QAM signal constellation can be used to transmit on average 3 bits per signal point, instead usual 4 bits per signal point. This can be technically useful, for example, in order to switch to 16-QAM with optimized probabilities in existing transmitters and receivers using, for instance, 8-QAM with the points $\{(+-\frac{1}{2}, +-\frac{1}{2}), (+-(1+\sqrt{3})/2,0), (0,+-(1+\sqrt{3})/2\}$ as signal constellation (i.e. 3 bits per signal point), accompanied by simultaneous power gain of approximately 1 dB.

With a method according to the present invention recoding is particularly simple to accomplish when the input data stream is a uniformly distributed sequence, especially a bit sequence. The recoding can then be accomplished using a loss-free decompression method such as the Huffman method. Accordingly, the inverse recoding operation on the receiver end is carried out using the corresponding compression method. A uniformly distributed sequence or bit sequence is obtained, for example, by encryption. This means that the possibly bothersome guarantee or generation of such a sequence can be achieved by the addition of a value-added operation, namely encryption. Since encryption will play an ever greater role in future transmission systems and is already being supplied today along with many systems, the new method is particularly practical. In the recoding of the incoming source bit stream to the signal points which are transmitted through the channel, use is made of a temporary register as buffer that serves to adapt the bit rate, which fluctuates as a function of time due to the transmission through the channel, to the bit rate of the source data. In an implementation of the circuit, this temporary register has a defined fixed length. In practice, this leads to the problem of a "buffer overflow". To solve this problem, the suggestion here is to select the channel data rate to be greater than the source data rate, it being advantageous to select the channel data rate to be slightly greater than the source data rate. In this manner, it is possible, with relatively little effort and expense, to specify the length of the temporary register or the length of the buffer so that there is only a negligibly small (known) probability of an overflow. When working with a channel data rate which is greater than the source data rate, it may occur that the channel will be ready to transmit information which is not yet available from the source. This effect is utilized here, for example, by transmitting synchronization data instead of the source data. A further solution involves transmitting other header or user data as well, instead of the synchronization data. The greater the channel data rate, the shorter it is possible to select the temporary register.

Further advantages, features and application possibilities of the present invention are revealed below.

BRIEF DESCRIPTION OF THE DRAWINGS

Hereinbelow, the present invention is described in greater detail with reference to the drawings, in which: embodiments with reference to the drawing, in which:

FIG. 4 shows a table 1, which indicates the probabilities p1, p2, p3, p4 for the signal points shown in FIG. 2;

FIG. 5 shows a table 2, which represents the mapping of the binary data to the signal points and vice versa.

DETAILED DESCRIPTION

Figure 1:
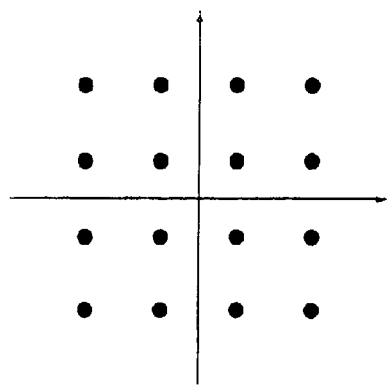
FIG. 1 shows a graphical representation of a 16-QAM signal constellation.

As stated above, known transmission methods employ orthogonal basis functions to represent the signal to be transmitted. In this case, a message signal s(t) is represented as the sum of orthogonal basis functions. A message signal can be regarded as a point in a K-dimensional space. The entirety of all permissible signal points is referred to as a signal constellation, the "16-QAM" signal constellation shown in FIG. 1, which represents one of the two-dimensional signal constellations, being especially popular.

If a signal constellation has a total of M signal points, $M_j$ of each of which have the signal energy $E_j$, and if the probability for the occurrence of such a signal point is equal to $P_j$, then, by setting the probabilities according to the formula given below, one obtains the values which are optimal according to power/information rate for that power. The value L indicates how many different energy levels occur in total.

$$(E_j-E_1)/(E_L-E_1)$$

$$p_j=p_1(p_L/p_1) \ j=1,2,\ldots, L \text{ and } E_{j-1}>E_j$$

Figure 2:
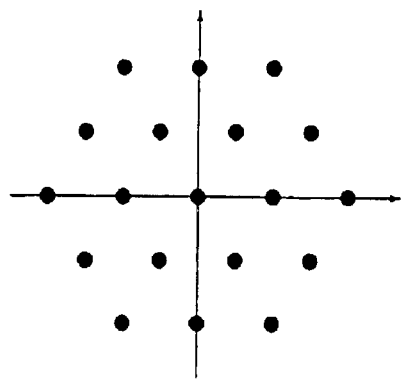
FIG. 2 shows a graphical representation of a hexagonal signal constellation.

Given here as an example is the hexagonal signal constellation in FIG. 2. For reasons of normalization, the minimum distance between the signal points is selected as one. Here, there are L=4 energy levels. $E_1=0$, $E_2=1$, $E_3=3$ and $E_{4=4}$. There is one signal point with signal energy zero ($M_1=1$) and 6 signal points each with signal energies 1, 3 and 4, i.e., $M_2=M_3=M_4=6$.

For example, to map a data stream with a defined probability distribution to the corresponding signal points, use is made of a loss-free data compression algorithm, such as the Huffman method. This data compression algorithm ensures that the corresponding signal points occur with the aforementioned probability. The Huffman method is described, for example, in D. A. Huffman, "*A Method for the Construction of Minimum Redundancy Codes*", Proc. IRE, Vol. 40, September 1952, pages 1098–1101, which is hereby incorporated by reference herein. In the following example, a binary bit sequence, in which the probability for ones and zeros is identical and in which the bits are statistically independent, is recoded, and specifically in such a way that with the signal constellation shown in FIG. 2 with 19 signal points, on average H=4 bits per signal point can be efficiently transmitted. From the indicated table 1 according to FIG. 4, one then obtains the probabilities for the occurrence of the individual signal points. The use of a data compression method leads to a correspondence of the kind found, for example, in table 2. With the correspondence shown in table 2 according to FIG. 5, one comes very close to the optimal mean signal energy $E_s=1.7224$. One obtains a mean signal energy of 1.8125. By comparison, the conventional 16-QAM signal constellation has a mean signal energy of 2.5. In other words, in comparison with the known 16-QAM, one obtains an improvement of 10 lg (2.5/1.8125) dB, that is, approximately 1.4 dB, with this simple method. With more complex correspondences, one can come as close as one wishes to the optimal value. For the purpose of illustration, with the above correspondence, the bit sequence 0111010000111110011101110001 produced with a coin would then be transmitted with the signal points $Z_{32}$ $Z_1$ $Z_{25}$ $Z_{23}$ $Z_{25}$ $Z_{21}$ $Z_{24}$ $Z_{25}$. $Z_1$ is the signal point with energy zero; $Z_{2j}$, where j=1 . . . 6, are the signal points with energy 1; $Z_{3j}$ are the signal points with energy 3; and $Z_{4j}$ are the points with energy 4.

The decoding after transmission follows accordingly.

In the following, a circuit arrangement for improved data transmission with the aid of the efficient use of multilevel modulation methods is explained in greater detail with reference to the block diagram according to FIG. 3.

It is assumed that a data source 1 supplies a data stream 2. A recoder 3 then ensures that a modulator 4 selects the corresponding signal points with the correct probability. After data stream 2 has been transmitted via a transmission channel 5, there follows, after a downstream demodulator 6, the corresponding inverse operation with the aid of a inverse recoder 7, whereupon data stream 2 finally arrives at a data sink 8. The respective data stream 2 is depicted on the connecting/transmission lines or channels between components 1, 3 through 8 by arrow points on the respective lines/channels.

In the recoding of the incoming source bit stream to the signal points which are transmitted through the channel, a temporary register (not shown) is inserted as buffer that is used to adapt the bit rate, which fluctuates as a function of time due to the transmission through the channel, to the bit rate of the source data. In each implementation in the form of a circuit, the temporary register or buffer has a defined length, this possibly leading in practice to a problem of overflow. This problem can be solved by selecting the channel data rate to be somewhat greater than the source data rate. It is therefore possible, with relatively little effort and expense, for the buffer length or the temporary-register length to be specified so that there is only a negligible small probability of a buffer overflow or temporary-register overflow.

If the channel data rate is selected to be slightly greater than the source data rate, it may occur in the practical implementation of a circuit arrangement that the channel will be ready to transmit information which is not yet available from the source.

This effect can be advantageously utilized by transmitting synchronization data instead of the source data. Furthermore, other header or user data can also be transmitted instead of the synchronization data. The greater the channel data rate in relation to the source data rate, the shorter it is possible to select the temporary register or temporary buffer.

A further solution to this problem of buffer overflow or underflow is to provide two or possibly more recoding tables in recoder 3, the one table leading to a channel data rate which is greater than the source data rate and the other table leading to a channel data rate which is lower than the source data rate. Recoder 3 can then be controlled as a function of the state of the temporary storage. That is, if the temporary storage is in danger of overflowing, the channel data rate is selected which is greater than the source data rate. In the opposite case, if there are almost no data left in the temporary storage, the channel data rate is selected which is lower than the source data rate.

Figure 3:
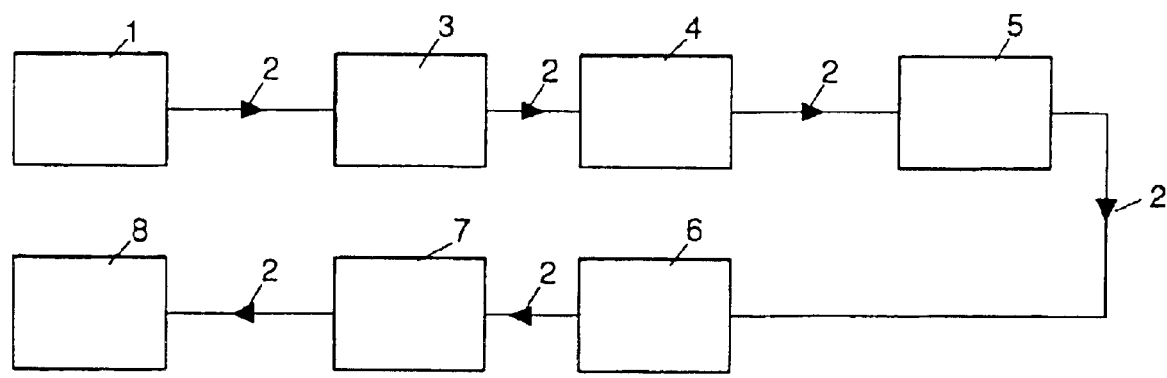
FIG. 3 shows a block diagram of a circuit arrangement for improved data transmission with the aid of the efficient use of multilevel modulation methods.
Figure 6:
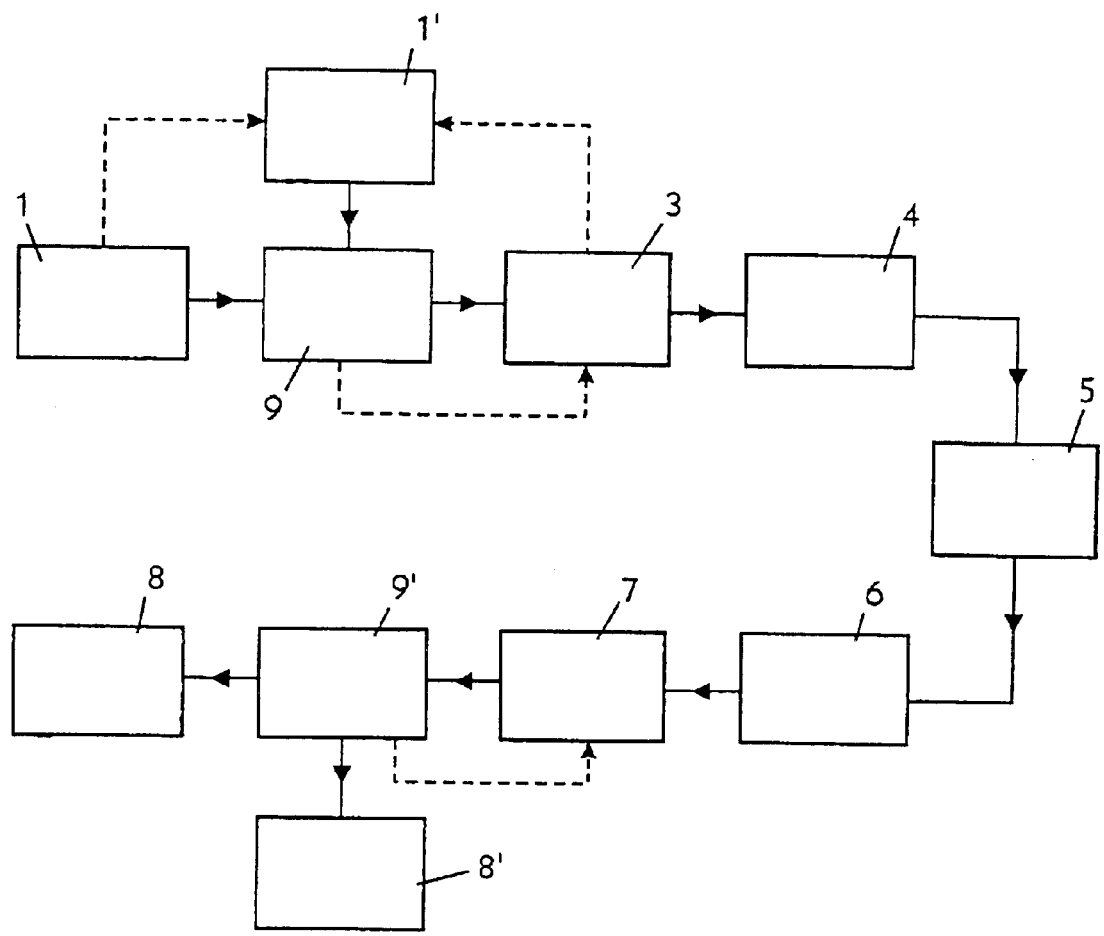
FIG. 6 shows a block diagram of a circuit arrangement for improved data transmission with the aid of the efficient use of multilevel modulation methods with recoder control as a function of temporary storage and with a second data source and second data sink.

FIG. 6, which is derived from FIG. 3, shows a block diagram of a circuit arrangement according to an embodiment of the present invention which includes the above possibility. The possibility of controlling recoder 3 as a function of temporary storage 9 is indicated in FIG. 6 by the broken line from the temporary storage with control unit/processing unit 9 to recoder 3. Likewise shown in FIG. 6 is an optional second data source 1' (for the special case when the rate of this data source is equal to zero, this source disappears). As described above, second data source 1' permits the transmission of additional data. The broken lines from recoder 3 to second data source 1' indicate the manner in which, for example, check data can be integrated into the method for the purpose of correcting errors. The source data rate and the rate of the generated error detection characters together must, on average, not exceed the mean channel data rate. Analogous to second data source 1' and the temporary storage with control/processing unit 9, a second data sink 8' and a temporary storage with control/processing unit 9' are inserted between data sink 8 and inverse recoder 7.

In other embodiments of the present invention special coding methods which have been designed, for example, for QAM or hexagonal signal may be used. Such special coding methods may be found, for example, in K. Huber, "*Codes over Gaussian Integers*", IEEE Transactions on Information Theory, Vol. 40, No. 1, January 1994, pp. 207–216 and K. Huber, "*Codes over Eisenstein-Jacobi Integers*", Finite Fields: Theory, Applications and Algorithms, (Las Vegas 1993), Contemporary Math. Vol. 168, American Math. Society, Providence, R.I., pp. 165–179 as well as K. Huber, "*Codes over Tori*", IEEE Transactions on Information Theory, Vol. 43, No. 2, March 1997, pp. 740–744, both of which are hereby incorporated by reference herein.

What is claimed is:

1. A circuit arrangement for data transmission using a multi-level modulation process, the multi-level modulation process using at least one orthogonal function, the circuit arrangement comprising:
    a data source for providing a data stream;
    a recoder downstream of the data source;
    a modulator for selecting signal points of a signal constellation according to at least one respective at least one predetermined and selected probability so as to optimize a respective at least one signal energy and a respective signal data rate, the selected signal points each having a defined respective energy, the modulator being connected to an output of the recoder;
    a transmission channel, an input of the transmission channel being connected to an output of the modulator;
    a demodulator, an input of the demodulator being connected to an output of the transmission channel;
    an inverse recoder for executing a first operation inverse to a second operation of the recoder, an input of the inverse recoder being connected to the demodulator;
    a data sink, an input of the sink being connected to an output of the inverse recoder;
    a temporary storage device including a control/processing unit, the temporary storage device being capable of triggering the recoder to switch between at least two recoding tables so that there is no storage overflow;
    a second temporary storage device including a second control/processing unit disposed between the inverse recoder and the sink; and
    a second data sink connected to the second temporary storage device.

2. A circuit arrangement for data transmission using a multi-level modulation process, the multi-level modulation process using at least one orthogonal function, the circuit arrangement comprising:
    a data source for providing a data stream;
    a recoder downstream of the data source;
    a modulator for selecting signal points of a signal constellation according to at least one respective at least one predetermined and selected probability so as to optimize a respective at least one signal energy and a respective signal data rate, the selected signal points each having a defined respective energy, the modulator being connected to an output of the recoder;
    a transmission channel, an input of the transmission channel being connected to an output of the modulator;
    a demodulator, an input of the demodulator being connected to an output of the transmission channel;
    an inverse recoder for executing a first operation inverse to a second operation of the recoder, an input of the inverse recoder being connected to the demodulator;
    a data sink, an input of the sink being connected to an output of the inverse recoder;
    a temporary storage device capable of triggering the recoder to switch between at least two recoding tables so that there is no storage overflow; and
    a second data source for providing the temporary storage with at least one of user data, synchronization data and check data.

3. The circuit arrangement as recited in claim 1 or 2 wherein the output of the modulator is connected in a buffered manner to the input of the transmission channel.

4. The circuit arrangement as recited in claim 3 wherein the output of the modulator is connected in a buffered manner to the input of the transmission channel via at least one of a temporary register and a buffer.

5. The circuit arrangement as recited in claim 1 or 2 wherein at least one source coding process is used for adapting a data sequence of the signal for the using of the at least one orthogonal basis function.

6. The circuit arrangement as recited in claim 5 wherein the at least one source coding process includes a Huffman method.

7. The circuit arrangement as recited in claim 1 or 2 wherein a first data source provides the signal for transmission and at least one source coding process is used for adapting a data sequence of the signal for the using of the at least one orthogonal basis function, the at least one source coding process including an error-correcting code adapted to the modulation process and a respective transmission channel for protection against transmission errors, error detection characters of the modulation process being inserted using a second data source.

8. The circuit arrangement as recited in claim 7 wherein the error-correcting code includes a block code.

9. The circuit arrangement as recited in claim 7 wherein the error-correcting code includes a convolution code.

10. The circuit arrangement as recited in claim 1 or 2 wherein the signal for transmission includes an encrypted input data stream.

11. The circuit arrangement as recited in claim 1 or 2 wherein a first data rate is selected for the transmission channel that is greater than a second data rate of the data stream.

12. The circuit arrangement as recited in claim 1 or 2 wherein synchronization data are transmitted during at least one time when no bits are present in the signal for transmission.

13. The circuit arrangement as recited in claim 1 or 2 wherein at least one of housekeeping data and user data are transmitted when no bits are present in the signal for transmission.

14. A method for providing for data transmission using a multi-level modulation process, the multi-level modulation process using at least one orthogonal function, the method comprising:

providing a data stream from a data source, wherein a recoder is downstream of the data source;

selecting, using a modulator, signal points of a signal constellation according to at least one respective at least one predetermined and selected probability so as to optimize a respective signal energy and/or a respective signal data rate, the selected signal points each having a defined respective energy, the modulator being connected to an output of the recoder, wherein an input of a transmission channel is coupled to an output of the modulator, and an input of a demodulator is coupled to an output of the transmission channel;

executing, using an inverse recoder, a first operation inverse to a second operation of the recoder;

wherein:
an input of the inverse recoder is coupled to the demodulator,
an input of a data sink is coupled to an output of the inverse recoder,
a temporary storage device includes a control/processing unit and is capable of triggering the recoder to switch between at least two recoding tables so that there is no storage overflow,
a second temporary storage device includes a second control/processing unit disposed between the inverse recoder and the sink, and
a second data sink is coupled to the second temporary storage device.

15. A method for providing for data transmission using a multi-level modulation process, the multi-level modulation process using at least one orthogonal function, the method comprising:

providing a data stream from a data source, wherein a recoder is downstream of the data source;

selecting, using a modulator, signal points of a signal constellation according to at least one respective at least one predetermined and selected probability so as to optimize a respective at least one signal energy and a respective signal data rate, the selected signal points each having a defined respective energy, the modulator being connected to an output of the recoder, wherein an input of a transmission channel is coupled to an output of the modulator, and an input of a demodulator is coupled to an output of the transmission channel;

executing, using an inverse recoder, a first operation inverse to a second operation of the recoder;

wherein:
an input of the inverse recoder is coupled to the demodulator,
an input of a data sink is coupled to an output of the inverse recoder,
a temporary storage device is capable of triggering the recoder to switch between at least two recoding tables so that there is no storage overflow, and
a second data source provides the temporary storage with at least one of user data, synchronization data and check data.

16. The method as recited in claim 14 or 15 wherein the output of the modulator is connected in a buffered manner to the input of the transmission channel.

17. The method as recited in claim 16 wherein the output of the modulator is connected in a buffered manner to the input of the transmission channel via at least one of a temporary register and a buffer.

18. The method as recited in claim 14 or 15 wherein at least one source coding process is used for adapting a data sequence of the signal for the using of the at least one orthogonal basis function.

19. The method as recited in claim 18 wherein the at least one source coding process includes a Huffman method.

20. The method as recited in claim 14 or 15 further comprising using a first data source to provide the signal for transmission and using at least one source coding process for adapting a data sequence of the signal for the using of the at least one orthogonal basis function, the at least one source coding process including an error-correcting code adapted to the modulation process and a respective transmission channel for protection against transmission errors, error detection characters of the modulation process being inserted using a second data source.

21. The method as recited in claim 20 wherein the error-correcting code includes a block code.

22. The method as recited in claim 20 wherein the error-correcting code includes a convolution code.

23. The method as recited in claim 14 or 15 wherein the signal for transmission includes an encrypted input data stream.

24. The method as recited in claim 14 or 15 further comprising selecting a first data rate for the transmission channel that is greater than a second data rate of the data stream.

25. The method as recited in claim 14 or 15 further comprising transmitting synchronization data during at least one time when no bits are present in the signal for transmission.

26. The method as recited in claim 14 or 15 further comprising transmitting at least one of housekeeping data and user data when no bits are present in the signal for transmission.

* * * * *